United States Patent [19]

Kobayashi

[11] Patent Number: 4,948,304

[45] Date of Patent: Aug. 14, 1990

[54] ADJUSTABLE TOOL GUIDE AND DRIVER FOR A BIT

[75] Inventor: Tsunemi Kobayashi, Miki, Japan

[73] Assignee: Kobayashi Gimlet Mfg. Co., Ltd., Hyogo, Japan

[21] Appl. No.: 131,557

[22] Filed: Dec. 11, 1987

[30] Foreign Application Priority Data

May 26, 1987 [JP] Japan .............................. 62-79503[U]

[51] Int. Cl.⁵ .............................................. B23B 45/06
[52] U.S. Cl. ........................................ 408/16; 33/638;
144/106; 408/115 R
[58] Field of Search .................... 408/14, 16, 110, 111,
408/112, 115 R, 115 B, 241 G, 241 B, 72 R, 72
B, 124, 1 R, 88; 33/630, 637, 638, 639; 144/219,
106; 30/347, 388; 81/177.5

[56] References Cited

U.S. PATENT DOCUMENTS

| 583,910 | 6/1897 | Knapp | 81/177.5 |
| 889,273 | 6/1908 | Thomas | 408/115 R X |
| 2,714,409 | 8/1955 | Primrose et al. | 81/177.4 |
| 3,077,129 | 2/1963 | Carles | 408/112 |
| 3,534,639 | 10/1970 | Treichler | 408/112 |
| 3,746,460 | 7/1973 | Lipe | 408/112 |
| 4,375,341 | 3/1983 | Schulze | 408/72 R |

Primary Examiner—Z. R. Bilinsky
Attorney, Agent, or Firm—Koda & Androlia

[57] ABSTRACT

A drive tool for a bit including a support portion for supporting a drive article which has an upper part and a lower part of a drive shaft equipped with a handle and a holding part of the bit respectively, a base frame on which the support portion is coupled by a support axle so that it is rotatable back and forth and a bit having its shank held into the holding part, wherein forward-driving force caused by rotation of the drive article allows the operator to accurately judge the boring depth, while an angle scale on the base frame enables the operator to accurately judge the angle of inclination of the hole with respect to the object to be bored.

4 Claims, 4 Drawing Sheets

ADJUSTABLE TOOL GUIDE AND DRIVER FOR A BIT

BACKGROUND OF THE INVENTION

1. Field of the Invention

The present invention relates to a drive tool for a bit which is designed to accurately drive the bit forward into a specified object.

2. Prior Art

Conventionally, a handle is mounted on a motorized drill or a hand drill wherein the drill proper is used as a drive tool for a bit or the like.

When drilling a hole in an object at a desired angle using a conventional drive tool, the bit can only be driven forward inaccurately because the drive tool cannot define a normal position for the bit at a desired angle. Therefore, the bit must be positioned based upon the operator's degree of skill.

Particularly, when making a perpendicular hole in a transparent object, if the hole is inclined, the walls of the hole will be conspicuously visible revealing the inaccuracy.

SUMMARY OF THE INVENTION

The present invention intends to solve the aforementioned problems and provides a drive tool for a bit whose working parts can accurately process a specified object while being driven forward after a support portion for supporting a drive article is erected on a base frame such that the support portion is rotatable about a support axle and the drive article. The drive article has an upper part and a lower part of a drive shaft equipped with a handle and a bit holding part respectively and is supported by the support portion such that the drive article is slidable lengthwise in relation to the support portion and rotatable at the same time.

Another object of the present invention is to provide a drive tool for a bit wherein the support portion has a scale for indicating the depth of the hole in the lengthwise direction.

Still another object of the present invention is to provide a drive tool for a bit wherein the support portion has a transparent hole in the lengthwise direction so that the bit holding part is visible through the transparent hole.

Yet another object of the present invention is to provide a drive tool for a bit wherein the base frame has a scale for indicating the angle of inclination of the support portion with respect to the base frame.

The final object of the present invention is to provide a drive tool for a bit wherein the handle also serves as a container with a lid in which the bit and other small parts may be housed.

DETAILED DESCRIPTION OF THE INVENTION

Figure 1:
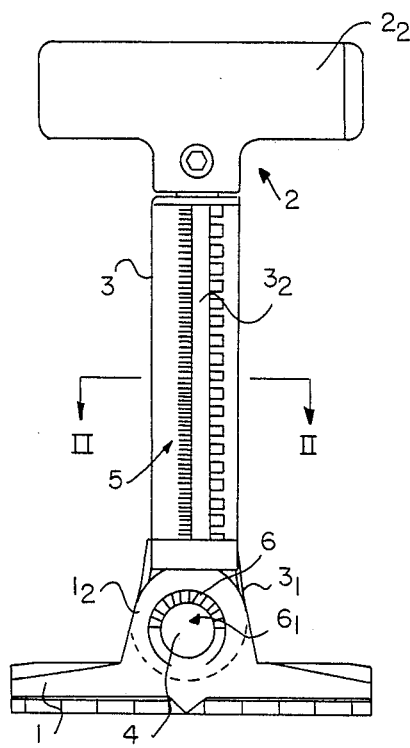
FIG. 1 is a front view of an embodiment according to the present invention.
Figure 2:
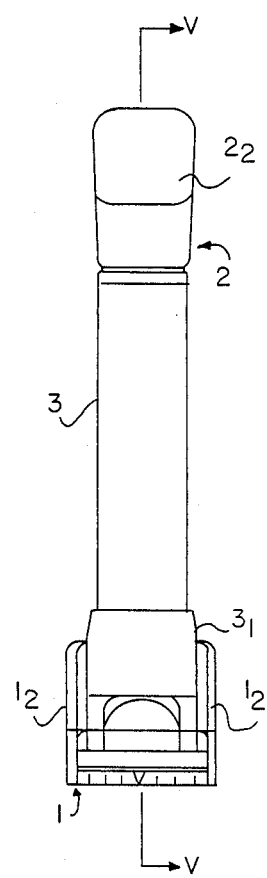
FIG. 2 is a side view of the same.
Figure 4:
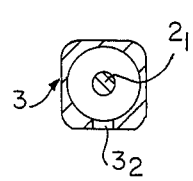
FIG. 4 is a cut-away end view taken on the line II—II of FIG. 1.
Figure 3:
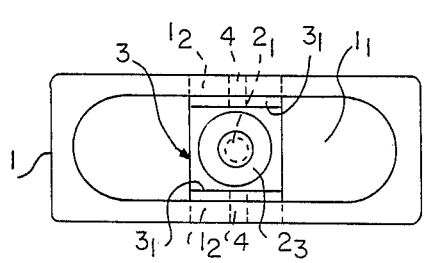
FIG. 3 is a bottom view of the same.
Figure 5:
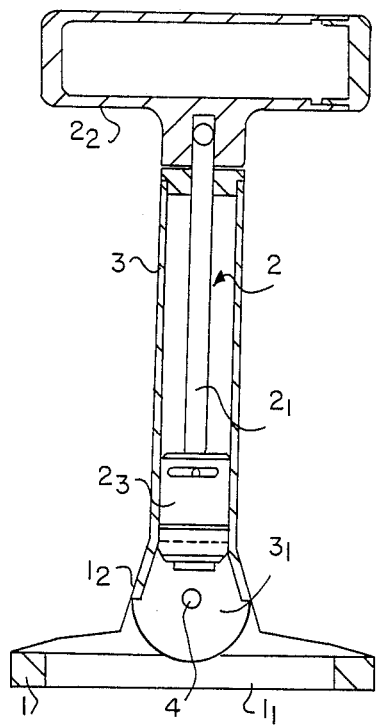
FIG. 5 is a sectional view taken on the line V—V of FIG. 2.
Figure 6:
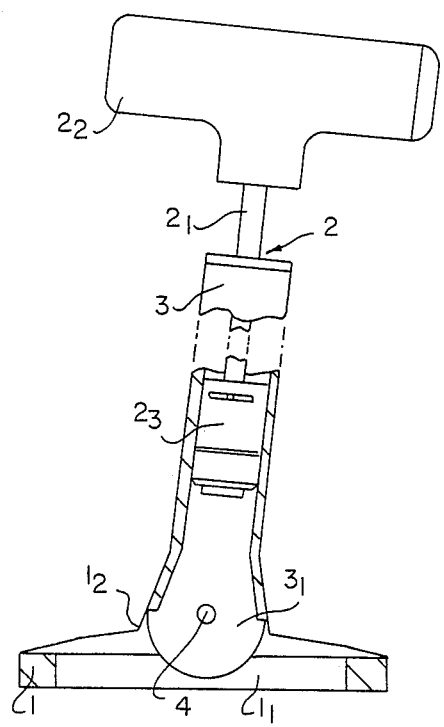
FIG. 6 is a partially broken front view of a state wherein the support portion is inclined.

A description of an embodiment in accordance with the teachings of the present invention is given below in conjunction with the accompanying drawings as follows:

Reference numeral 1 is a base frame which is rectangular in shape. The base frame 1 has an opening part $1_1$ and bearing parts $1_2$ and $1_2$ along the front and rear parts thereof such that the opening part $1_1$ is interposed between these front and rear parts which are opposite to each other.

Reference numeral 2 is a drive article which is rotatable and vertically slidable in the support portion 3. In the drive article 2 a T-shaped handle $2_2$, whose open space serves as a container with a lid, is screwed onto the upper end part of a metallic drive shaft $2_1$ and a holding part $2_3$ for chucking the shank $7_1$ of the bit 7 is provided on the lower part thereof downwardly.

Reference numeral 3 is a support portion for supporting the drive article 2, comprising a transparent plastic cylinder, whose front face is furnished with a depth scale 5 in the lengthwise direction, thereby enabling the bit 7 to project downwardly from the base frame 1.

The present invention makes it easy to realize the necessary depth of a hole to be drilled.

The supporting portion 3 has a front part and a rear part on its lower part $3_1$ fixedly coupled to the bearing parts $1_2$ and $1_2$ by a support axle 4 such that the supporting portion 3 may be rotatable about the support axle 4. Reference line $6_1$ is provided in front of the support axle 4 and an angle scale 6 is provided opposite the reference line $6_1$ of the support axle 4 in front of the bearing 12 which supports the support axle 4.

The angle of inclination of the support portion 3 can be easily adjusted with respect to the base frame 1 by making an adjustment between the reference line $6_1$ and the angle scale 6, thereby making it possible to accurately bore holes in the object 8 at different angles.

The drive article 2 is inserted into the support portion 3, while its chuck $2_3$ is being directed downward and, at the same time, the drive article 2 is rotatable about and vertically slidable in the support portion 3.

When the drive article 2 is outside the support portion 3, the bit 7 may be mounted or detached. According to the embodiment, rotational force for driving the drive article 2 is obtained by means of the drive shaft $2_1$ and the T-shaped handle $2_2$. Since the handle $2_2$ can be connected to a click handle or a power source may be connected to the drive shaft $2_1$ with the handle $2_2$ removed, if the drive shaft $2_1$ is adapted to be rotated, this point is not limited to the embodiment.

With above-described construction, if the tool of the present invention is used to make a hole in a wooden, plastic or metallic object, the shank $7_1$ of a predetermined auger bit 7 is held in the holding part $2_3$ of the drive article 2 while the handle $2_2$ is held manually. Then, the drive article 2 is pulled up in the support portion 3 so that the auger bit 7 is pushed into the support portion 3 to reveal the blade $7_2$ of the auger bit 7 from the lower area of the support portion 3 and the auger bit 7 contacts the object 8 such that the center of the blade 7₂ is oriented at a predetermined position relative to the object 8 to define the forward-driving direction of the auger bit 7. The support portion 3 fixedly coupled to the base frame by the support axle 4 is rotated back and forth, thereby adjusting the angle to establish a predetermined angle, e.g. a right angle to the base frame 1. Furthermore, the blade 7₂ of the auger bit 7 is pushed against the object 8 while the handle 2₂ is rotated thereby starting the hole so that the starting point of the hole is marked in the object 8.

Figure 7:
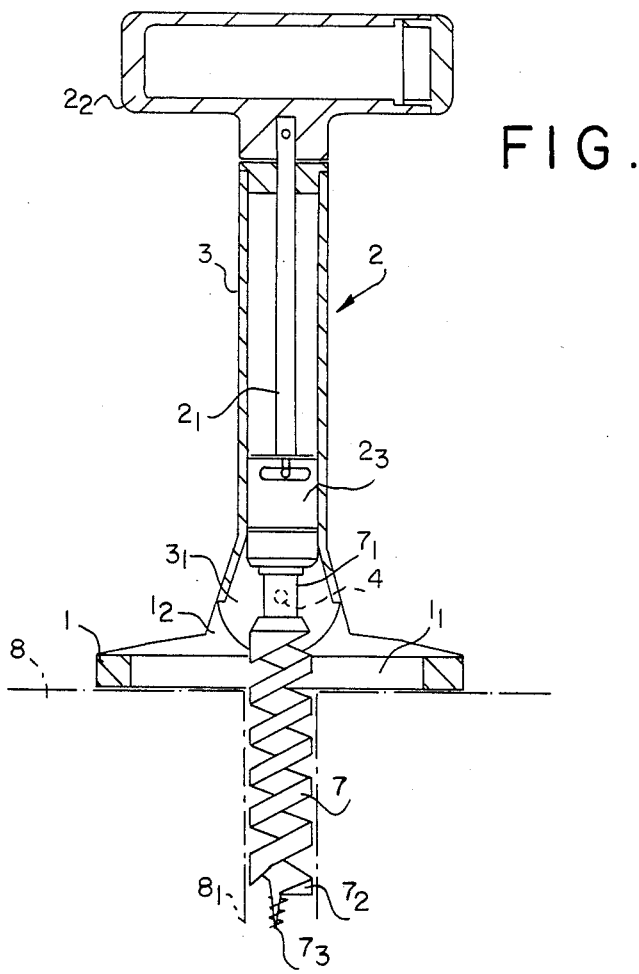
FIG. 7 is a view of a state wherein an auger bit has perpendicularly cut the object to be bored.
Figure 8:
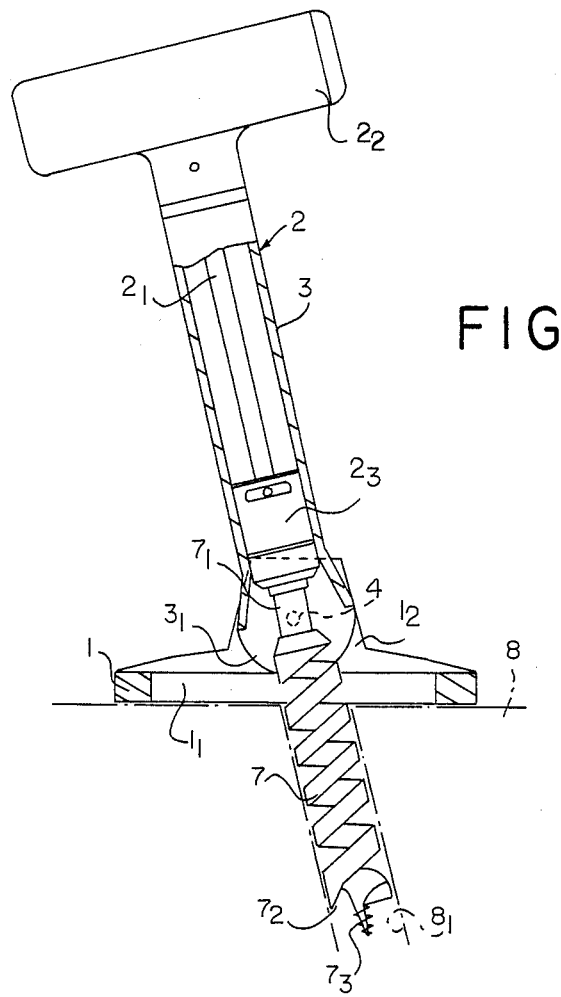
FIG. 8 is a view of the state wherein the auger bit cuts the object to be bored at an inclined angle relative to the object.

During such operation, as shown in FIGS. 7 and 8, if the hole is made by the auger bit 7 in a wooden or like object with the top end of the blade 7₂ having a guiding screw 7₃, the auger bit 7 rotates on its own and generates the forward driving force of the auger bit 7 relative to the guiding screw 7₃. This allows the blade 7₂ of the auger bit 7 to continue to make the hole. The drive article 2 is pushed against the object 8 so that it is not necessary to drive the auger bit 7 forward and further so that simply rotating the drive shaft 2₁ with the handle 2₂ enables the hole to be started.

When using a plastic or metallic gimlet and driver bit to make a hole wherein the blade 7₂ does not have a guiding screw 7₃, the drive shaft 2₁ must be rotated while the handle 2₂ is pushed down.

If the part of the drive shaft 2₁ from which the handle 2₂ is removed has a power source as in a motorized drill, a hole can be made easily and accurately.

When making a fixed hole, it is preferable to fix the support portion 3 to the base frame 1.

When the bit starts to cut into the object 8, after the drive article 2 is supported by the support portion 3 and the bit 7 cuts accurately and sufficiently into the object to be processed so that the boring direction is set, boring is stopped, the bit is drawn out from the hole, and the drive article 2 is taken off from the support portion 3 so that the bit 7 which is held into the holding part 2₃ of the drive article 2 is inserted into the hole, whereby the hole can be continued to be made.

Shifts between manual power for driving the bit 7 and mechanical power can be simply made so that the processing range is extremely wide.

Thus, the present invention ensures accurate operation, whereby more accurate work can be performed as well as making the operating method simple. Thus, anyone can use the device of the operating method simple. Thus, anyone can use the device of the present invention since it has characteristics which enable inexperienced workers to carry out their work in a manner equal to the work of skilled operators.

I claim:
1. An adjustable tool guide and driver for a bit comprising:
    a base having an opening provided therethrough;
    a single elongated hollow driver support portion;
    a support axle for pivotally coupling said driver support portion to said base such that one end of said two open ends of said driver support portion is adjacent said opening in said base; and
    a driver slidably and rotatably provided in said driver support portion, said driver comprising a drive shaft extending longitudinally of the driver support portion and having one end adjacent said opening in said base and another end of said shaft adjacent another end of said driver support portion, a holder portion slideable in said driver support portion and for holding said bit provided on said one end of said drive shaft and a handle provided on said another end of said drive shaft, said drive shaft being further slideably supported at said one end by said driver support portion and at said another end by said holder portion sliding in said driver support portion.

2. An adjustable tool guide and driver for a bit as defined in claim 11 characterized in that said driver support portion is a cylinder.

3. An adjustable tool guide and driver for a bit as defined in claim 1 characterized in that said support portion has a transparent hole in its lengthwise direction.

4. An adjustable tool guide and driver for a bit as defined in claim 1 characterized in that said support portion has a depth scale for indicating a boring depth in its longitudinal direction.

* * * * *